United States Patent
Hopperton

(10) Patent No.: US 10,416,281 B2
(45) Date of Patent: Sep. 17, 2019

(54) REGIONAL POSITIONING SYSTEM

(71) Applicant: Mark Hopperton, Ramona, CA (US)

(72) Inventor: Mark Hopperton, Ramona, CA (US)

( * ) Notice: Subject to any disclaimer, the term of this patent is extended or adjusted under 35 U.S.C. 154(b) by 289 days.

(21) Appl. No.: 15/432,723

(22) Filed: Feb. 14, 2017

(65) Prior Publication Data

US 2017/0248683 A1     Aug. 31, 2017

Related U.S. Application Data

(60) Provisional application No. 62/301,526, filed on Feb. 29, 2016.

(51) Int. Cl.
| | |
|---|---|
| *G01S 5/14* | (2006.01) |
| *G01S 13/76* | (2006.01) |
| *G01S 13/87* | (2006.01) |
| *G01S 17/42* | (2006.01) |
| *H04W 40/24* | (2009.01) |
| *H04W 64/00* | (2009.01) |

(52) U.S. Cl.
CPC .............. *G01S 5/14* (2013.01); *G01S 13/765* (2013.01); *H04W 40/244* (2013.01); *G01S 13/878* (2013.01); *G01S 17/42* (2013.01); *H04W 64/00* (2013.01)

(58) Field of Classification Search
CPC . G01S 5/14; G01S 17/42; G01S 13/76; G01S 13/42; G01S 5/30; G01S 13/878; G01S 13/765; H04W 64/00; H04W 40/244; H04W 64/003; H04W 4/80
See application file for complete search history.

(56) References Cited

U.S. PATENT DOCUMENTS

| | | | |
|---|---|---|---|
| 9,716,980 B1 * | 7/2017 | Thiagarajan | H04W 4/04 |
| 2003/0142587 A1 * | 7/2003 | Zeitzew | G01S 7/52004 367/127 |
| 2011/0078350 A1 | 3/2011 | Carls | |
| 2012/0106380 A1 | 5/2012 | Vaidyanathan et al. | |
| 2013/0058196 A1 | 3/2013 | Holm | |
| 2015/0087330 A1 * | 3/2015 | Prechner | H04W 4/023 455/456.1 |
| 2015/0247916 A1 | 9/2015 | Bartov et al. | |
| 2015/0308835 A1 | 10/2015 | Hansen et al. | |
| 2016/0057613 A1 * | 2/2016 | Hines | H04W 8/22 455/419 |
| 2017/0195936 A1 * | 7/2017 | Want | H04W 12/06 |

OTHER PUBLICATIONS

International Search Report and Written Opinion for related application No. PCT/US2017/017779, dated May 17, 2017, in 16 pages.

* cited by examiner

*Primary Examiner* — Margaret G Mastrodonato

(74) *Attorney, Agent, or Firm* — Procopio, Cory, Hargreaves & Savitch LLP

(57) ABSTRACT

Regional positioning system using timed pulses. In an embodiment, a plurality of beacon devices are selected by a processor of a target device. For each beacon device, a connection to the beacon device is established, a first pulse is transmitted to the beacon device, a second pulse is received from the beacon device, a flight duration, including both a time of flight of the first pulse and a time of flight of the second pulse, is timed, and a distance to the beacon device is calculated based on the flight duration. A location of the target device is then computed based on the calculated distances for the selected beacon devices and the locations of the beacon devices.

24 Claims, 3 Drawing Sheets

REGIONAL POSITIONING SYSTEM

CROSS-REFERENCE TO RELATED APPLICATIONS

This application claims priority to U.S. Provisional Patent App. No. 62/301,526, filed on Feb. 29, 2016, the entirety of which is hereby incorporated herein by reference.

BACKGROUND

Field of the Invention

The embodiments described herein are generally directed to a regional positioning system, and, more particularly, to transmit-and-response range-finding.

Description of the Related Art

There have been prior attempts to create a high-precision indoor positioning system. While a few have been functional, none have become widespread or economical. With the advent of Bluetooth™ LE and iBeacon™ technology, it was assumed that indoor tracking systems would become commonplace. Some have claimed that iBeacon™ can be used to implement an indoor tracking system similar to the Global Positioning System (GPS). Unfortunately, the technique used by iBeacon™ is not capable of this type of resolution and triangulation.

Conventionally, there are three techniques employed for determining the position of a target within a region. All three techniques require placing one or more beacons in known locations:

(1) Use signal strength to determine the distance of a target relative to a beacon of known location. This is the technique currently used by iBeacon™. Unfortunately, signal strength can vary greatly, depending on the objects (e.g., people, electronics, furniture, plants, etc.) around and between the beacon and the target. As a result, the target can only determine a rough range to the beacon (immediate 0-0.3 m, low 0.4-2 m, and high greater than 2 m). In addition, these rough ranges are not guaranteed due to unknown fluctuations in the signal strength received by the target.

(2) Reflect a signal off of a target, and use the length of time for the signal to reach the target and return to determine the distance of the target. This is the technique used by radar and laser range finders. It has the advantage of being very accurate and not requiring all devices' clocks to be synchronized. However, it has the disadvantage of requiring the target to be within a line of sight of the range-finding device.

(3) Synchronize the clocks of all devices, with beacons at known locations sending a signal at regular intervals, and determine a target's position using the arrival times of these signals. This is the technique used by GPS. It has the advantage of being very accurate and able to operate with an unlimited number of targets without using additional bandwidth. However, it has the disadvantage of requiring the clocks of all of the beacons to be highly synchronized.

There have been a number of devices created using the second and third techniques in their pure form (e.g., radar guns, handheld GPS devices). However, all of these devices are unsuitable for use in an indoor positioning system.

SUMMARY

Accordingly, embodiments are disclosed for a new technique for highly accurate range-finding in an indoor or other regional positioning system.

In an embodiment, a first method is disclosed. The first method comprises using at least one hardware processor of a target device to: select a plurality of beacon devices; for each of the plurality of beacon devices, connect to the beacon device, transmit a first pulse to the beacon device, receive a second pulse from the beacon device, time a flight duration including both a time of flight of the first pulse and a time of flight of the second pulse, and calculate a distance to the beacon device based on the flight duration; and compute a location of the target device based on the calculated distances for the plurality of beacon devices and locations of the plurality of beacon devices.

In another embodiment, a second method is disclosed. The second method comprises using at least one hardware processor of a beacon device to: connect to a target device; receive a first pulse from the target device; upon receiving the first pulse, wait for a time period indicated by a pulse delay value; and once the time period ends, transmit a second pulse to the target device.

In another embodiment, a method is disclosed. The method comprises using at least one hardware processor of a device to: determine whether the device is moving or stationary; when the device is determined to be moving, switching the device to the target device of the first method; and, when the device is determined to be stationary, switching the device to the beacon device of the second method.

In another embodiment, a system is disclosed. The system comprises: a transceiver; and at least one hardware processor that selects a plurality of beacon devices, for each of the plurality of beacon devices, connects to the beacon device, transmits a first pulse to the beacon device via the transceiver, receives a second pulse from the beacon device via the transceiver, times a flight duration including both a time of flight of the first pulse and a time of flight of the second pulse, and calculates a distance to the beacon device based on the flight duration, and computes a location of the system based on the calculated distances for the plurality of beacon devices and locations of the plurality of beacon devices.

In another embodiment, a system is disclosed. The system comprises: a transceiver; and at least one hardware processor that connects to a target device; receives a first pulse from the target device; upon receiving the first pulse, waits for a time period indicated by a pulse delay value; and once the time period ends, transmits a second pulse to the target device.

In another embodiment, a non-transitory computer-readable medium having instructions stored thereon. The instructions, when executed by a processor, cause the processor to: select a plurality of beacon devices; for each of the plurality of beacon devices, connect to the beacon device, transmit a first pulse to the beacon device, receive a second pulse from the beacon device, time a flight duration including both a time of flight of the first pulse and a time of flight of the second pulse, and calculate a distance to the beacon device based on the flight duration; and compute a location of the processor based on the calculated distances for the plurality of beacon devices and locations of the plurality of beacon devices.

In another embodiment, a non-transitory computer-readable medium having instructions stored thereon. The instructions, when executed by a processor, cause the processor to: connect to a target device; receive a first pulse from the target device; upon receiving the first pulse, wait for a time period indicated by a pulse delay value; and once the time period ends, transmit a second pulse to the target device.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Embodiments of systems and methods are disclosed herein for highly accurate range-finding in a regional positioning system. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

In an embodiment, the disclosed embodiments implement a new transmit-and-response technique for range-finding that includes a target sending a pulse to a plurality of beacons, and each of the plurality of beacons responding by sending a pulse to the target. After receiving the pulses from the plurality of beacons, the target can calculate the distance between the target and each beacon, and compute the position of the target.

1. System Overview

Figure 1:
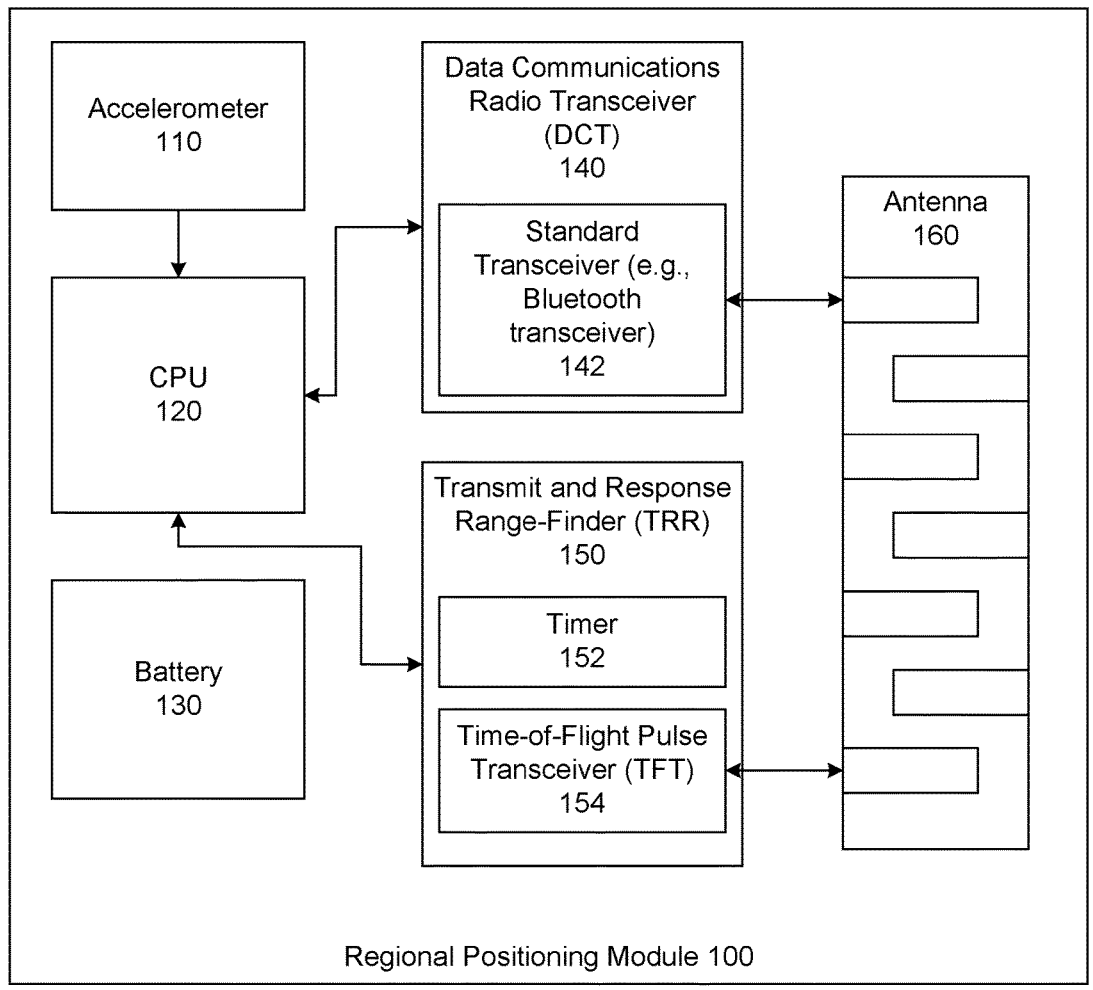
FIG. 1 illustrates a regional positioning module, according to an embodiment.

FIG. 1 illustrates an example system that is capable of determining its location within a two-dimensional or three-dimensional region, according to an embodiment. The system, referred to herein as regional positioning module 100, may be capable of determining its location in three dimensions with an accuracy of one meter or less, for example, when it is within a one-hundred meter range from four other stationary regional positioning modules 100. A regional positioning module 100 that is stationary is referred to herein as a "beacon," whereas a regional positioning module 100 that is moving is referred to herein as a "target." It should be understood that a particular regional positioning module 100 may switch from a target to a beacon (e.g., when it is moving and then remains motionless, for example, for a predetermined amount of time), and may switch from a beacon to a target (e.g., when it is motionless and then begins moving). It should also be understood that a particular regional positioning module 100 could be fixed, in which case it may always be a beacon.

In an embodiment, each regional positioning module 100 comprises an accelerometer 110, a central processing unit (CPU) 120, a battery 130 to provide power to one or more components of module 100, a data communications radio transceiver (DCT) 140, a transmit and response range-finder (TRR) 150, and an antenna 160.

In an embodiment, accelerometer 110 provides one or more acceleration signals to CPU 120. These acceleration signals are indicative of an acceleration or other motion characteristic of module 100. The particular implementation of accelerometer 110 is not important, as long as the signals produced by accelerometer 110 can be used to determine whether module 100 is moving and/or stationary.

In an embodiment, CPU 120 receives signals from accelerometer 110, and, based on the signals, determines whether or not module 100 is in motion. When CPU 120 determines that module 100 is in motion, CPU 120 switches module 100 to a target mode (e.g., by switching TRR 150 to a Ranging Mode). On the other hand, when CPU 120 determines module 100 is stationary, CPU 120 switches module 100 to a beacon mode (e.g., by switching TRR 150 to a Reflecting Mode). CPU may determine that module 100 is in motion after module 100 is in motion for a predetermined time period (e.g., a few seconds) and/or may determine that module 100 is stationary after a predetermined time period (e.g., a few seconds), in order to prevent a quick succession of switching between target and beacon modes. In addition, CPU may trigger, facilitate, and/or implement one or more of the steps in target procedure 200 and beacon procedure 300 illustrated in FIGS. 2A and/or 2B. Furthermore, CPU may execute protocols for DCT 140, calculate the relative position of module 100 within the region, maintain system integrity, and/or implement other system functionality.

In an embodiment, DCT 140 identifies the beacons within range of module 100 in target mode, and communicates a beacon's relative position within a three-dimensional region within beacon mode. DCT 140 enables communications with other devices (e.g., targets in beacon mode, and beacons in target mode), and enables range-finding sequences (e.g., target procedure 200 and beacon procedure 300) to be performed in target mode and beacon mode under the control of CPU 120. Furthermore, DCT 140 may comprise a standard transceiver 142, such as a Bluetooth™ transceiver, which implements a standard wireless technology, such as Bluetooth™.

In an embodiment, TRR 150 comprises a timer 152 and time-of-flight pulse transceiver (TFT) 154. TFT 154 transmits a time-of-flight pulse to a beacon, and listens for a time-of-flight pulse transmitted from a beacon. Timer 152 may be a nanosecond timer which is capable of timing a time of flight that is accurate to a nanosecond over a duration of, for example, ten microseconds. However, it should be understood that more or less time granularity may be used. Timer 152 is used in conjunction with TFT 154 to provide the time between the transmission of a time-of-flight pulse, by TFT 154 of a target, and reception, by TFT 154 of the target, of a time-of-flight pulse transmitted by a TFT 154 of a beacon. As will be described elsewhere herein, this time between transmission and reception may include a predetermined amount of delay at TFT 154 of the beacon.

In an embodiment, TRR 150 accepts an operating mode command, for example, from CPU 120. If the operating mode command is to turn off or sleep, TRR 150 may turn itself off or sleep. On the other hand, if the operating mode command designates a mode, such as a target mode or beacon mode, TRR 150 may initiate an operation associated with the designated mode. For example, if the operating command designates the target mode (which may also be referred to herein as a "ranging mode"), TRR 150 may transmit a time-of-flight pulse, and then listen for a responsive time-of-flight pulse after a designated delay period. On the other hand, if the operating command designates the beacon mode (which may also be referred to herein as a "reflection mode"), TRR 150 may listen for a time-of-flight pulse, and then transmit a responsive time-of-flight pulse after a designated delay period. When operating in the target mode, timer 152 times the round-trip travel of the time-of-flight pulses to and from each beacon. TRR 150 may then pass this round-trip time from timer 152 to CPU 120, which may use the round-trip time to calculate the distance to each beacon.

In an embodiment, TRR 150 may operate in combination with currently-available Bluetooth™ LE devices (e.g., an embodiment of DCT 140, possibly in combination with accelerometer 110, CPU 120, battery 130, and/or antenna 160, which may be referred to herein as a "BLD") to provide an economical, high-precision indoor tracking system. The BLD may handle the high-level protocols, device identification data, time-of-flight range-finding and position calculations and data, while TRR 150 is responsible for transmission and reception of time-of-flight pulses (e.g., via TFT 154), and timing the time-of-flight pulses (e.g., via timer 152, which may be a nanosecond timer).

Thus, in such an embodiment, there are two separate and distinct communication paths between each target and each beacon. The BLD may communicate using Bluetooth™ low-energy technology and operate in the 2.400 GHz-2.4835 GHz ISM (Industrial, Scientific and Medical) band using a 40 2-MHz channel with a bit rate of 1 Mbit/s. The BLD communication protocol may use standard Bluetooth™ LE by making use of standard universally unique identifiers (UUIDs), as well as implementing a custom set of UUIDs. TRR 150, on the other hand, may operate in the same spectrum range as the BLD, but use much shorter pulse transmissions. Preferably, the entire transmission-response sequence of target procedure 200 and beacon procedure 300, illustrated in FIGS. 2A and 2B, can be performed in less than one microsecond.

In an embodiment, each target may use a BLD to find and communicate with nearby beacons, one at a time (or alternatively, in parallel), and use TRR 150 and target procedure 200 to determine the distance between the target and beacons. Once the target has acquired the distance to and location of three beacons (for two-dimensional triangulation) or four beacons (for three-dimensional triangulation), the target can use triangulation to determine its exact location. Alternatively, the target may only communicate with one or two beacons, in which case, the target may not be able to determine its exact location, but could at least determine its distance to the beacon (e.g., its distance to a specific aisle of a supermarket if a beacon is located in that aisle). Thus, the BLD (e.g., a combination of DCT 140, CPU 120, and antenna 160) may provide communications between the BLD and other Bluetooth™ devices, data communication between targets and beacons, triangulation calculations, and/or a Bluetooth™ interface. TRR 150 may provide a nanosecond clock, nanosecond clock synchronization, a time-of-flight pulse transceiver, and/or time-of-flight pulse timing tracking.

Notably, radio waves travel at just under one foot per nanosecond. Bluetooth™ LE has an effective range of about one-hundred yards. Therefore, a radio pulse will take a maximum of 300 ns to reach any device within range. A timer (e.g., timer 152) with nanosecond accuracy will be able to accurately determine the distance, between a target and beacon within a Bluetooth™ LE's range from each other, to within one foot (e.g., within 0.3 meters). With an estimated maximum response time for a device of under 400 ns, the total range-finding procedure has a maximum execution duration of one microsecond. A 10-bit timer (e.g., timer 152) may be used to maintain nanosecond accuracy over a duration of one microsecond.

In an embodiment, TRR 150 is implemented as a chip with one or more of the following methods of communication:

(1) I2C Bus: communicates control and command registers with CPU 120 or the companion BLD;
(2) Time-of-Flight Pulse Transceiver (e.g., TFT 154): directly communicates with other Time-of-Flight Pulse Transceivers with nanosecond timing accuracy; and/or
(3) (Optional) Three I/O Pins and a Timing Pin: allow CPU 120 or BLD to directly set operating modes and to supply a clock signal to other components.

Furthermore, the TRR chip may comprise the following pin-outs:

| Pin | Description |
| --- | --- |
| GND | ground |
| Vdd | +3 V |
| SDA | serial data line |
| SCL | I2C serial clock line |
| RFn | antenna |
| RFp | antenna |
| CLK | provided clock (optional) |
| OM0 | operating mode (optional) |
| OM1 | operating mode (optional) |
| OM2 | operating mode (optional) |

In addition, the TRR chip may comprise the following internal registers, which may be accessed via the I2C Bus:

| Register | Data Type | Description |
| --- | --- | --- |
| OperatingMode | unit2 | sets and identifies current operating mode |
| PulseDelay | uint16 | sets the delay time in nanoseconds |
| TravelTime | uint16 | records the round-trip time-of-flight in nanoseconds |

In an embodiment, the TRR chip is able to generate and transmit, as well as receive, time-of-flight pulses. A time-of-flight pulse may be a radio transmission within the Bluetooth™ LE frequency, but configured so as not to seriously interfere with Bluetooth™ LE transmissions. Each time-of-flight pulse may have a duration no longer than one microsecond, and each time-of-flight pulse transmission may be accurately timed to the nanosecond.

In an embodiment, the TRR chip has three operating modes, which can be set via the OperatingMode register:
(1) OFF Mode: the TRR chip is neither transmitting nor listening for a time-of-flight pulse.
(2) RANGING Mode: the TRR chip transmits a time-of-flight pulse, waits the number of nanoseconds in the PulseDelay register and then begins listening for a responsive time-of-flight pulse, and records a time of flight in the TravelTime register upon receiving a responsive time-of-flight pulse.
(3) REFLECTION Mode: the TRR chip listens for a time-of-flight pulse, and, upon receiving a time-of-flight pulse, waits the number of nanoseconds in the PulseDelay register and then transmits a responsive time-of-flight pulse.

2. Process Overview

FIG. 2 illustrates a target procedure 200, to be performed by a regional positioning module 100 operating in target mode, and a beacon procedure 300, to be performed by a regional positioning module 100 operating in beacon mode, according to an embodiment. As discussed herein, in an embodiment, each regional positioning module 100 may switch between a target mode and a beacon mode (and optionally an off mode). Thus, a module 100 may act as a target at one time (e.g., when it is determined to be moving), but act as a beacon at a different time (e.g., when it is determined to be stationary). Accordingly, it should be understood that each regional positioning module 100 may be configured to perform both target procedure 200 and beacon procedure 300, depending on its current mode.

At a high level of target procedure 200, when a module 100 operating in target mode (which may be referred to herein simply as a "target") enters a region, it will select and connect to a set of modules 100 operating in beacon mode (each of which may referred to herein simply as a "beacon") for the purposes of triangulation. The following range-finding sequence will then be performed between the target and each of the selected beacons:

(1) Target requests Beacon's position within the region;
(2) Target negotiates the Pulse Delay;
(3) Target signals Beacon to prepare to receive a time-of-flight pulse;
(4) Target transmits the time-of-flight pulse to Beacon;
(5) Beacon receives time-of-flight pulse;
(6) Beacon waits for amount of time specified by the Pulse Delay;
(7) Beacon transmits a time-of-flight pulse;
(8) Target receives the time-of-flight pulse from Beacon;
(9) Beacon signals Target that it echoed the time-of-flight pulse and disconnects;
(10) Target calculates the distance to Beacon using the time of flight.

Once the target has calculated the distance to each of the selected beacons, the target will use the distance to each selected beacon and each beacon's position within the region to triangulate its relative position within the region.

Target procedure 200 will now be described in greater detail, according to the embodiment illustrated in FIG. 2A. Target procedure 200 may be performed in a matter of milliseconds.

In step 205, the target (e.g., a regional positioning module 100 in target mode) listens for beacon advertisements (e.g., broadcast signals). During step 205, the target may receive broadcast signals from a plurality of beacons.

In step 210, the target selects a plurality of beacons for range-finding. For instance, the target may select at least three beacons (for two-dimensional range-finding), and preferably at least four beacons (for three-dimensional range finding). The selection process may utilize any known criteria (e.g., the four beacons with the highest signal strength). Once the plurality of beacons have been selected, the target performs steps 215-280 for each of the selected beacons.

In step 215, the target pairs with the beacon (e.g., using Bluetooth™ LE). Pairing may be performed, for example, by DCT 140 of the target (e.g., in the BLD discussed above).

After successfully pairing with the beacon, in step 220, the target requests the beacon's location from the beacon, and receives the beacon's location from the beacon. This step may also be performed, for example, by DCT 140 of the target.

In step 225, the target requests the pulse delay from the beacon, and receives the pulse delay from the beacon. Again, this step may be performed by DCT 140 of the target. The pulse delay specifies the amount of time that the beacon will wait between receiving a time-of-flight pulse from the target and sending a responsive time-of-flight pulse to the target. It should be understood that the order of steps 220 and 225 may be reversed without affecting target procedure 200.

In step 230, the target prepares to perform range-finding, for example, by sending a preparation message to the beacon and/or performing other preparatory operations (e.g., turning on and/or initializing TRR 150 of the target).

In step 235, the target activates a Ranging Mode (e.g., of TRR 150 of the target). Steps 240-265 represent a range-finding technique which may be implemented by TRR 150 of the target. This technique may be performed in a matter of nanoseconds.

In step 240, the target (e.g., via TFT 154 of the target) transmits a range-finding time-of-flight pulse to the beacon.

In step 245, after transmitting the time-of-flight pulse, the target waits the amount of time specified by the pulse delay received from the beacon in step 225, before proceeding to step 250. In step 250, after waiting the amount of time specified by the pulse delay, the target begins a timer. For example, TRR 150 may start timer 152, which may be capable of accurately measuring time to the nanosecond. Alternatively, instead of starting the timer after the pulse delay amount, the timer may be started at the time that the time-of-flight pulse is transmitted, and the pulse delay may be subsequently subtracted or otherwise exclude from the final timer value. It should be understood that other alternatives are contemplated and possible, as long as the timer amount used to calculate the distance between the target and beacon in step 275 represents the sum of the time that the time-of-flight pulse, transmitted by the target, takes to travel to the beacon and the time that the time-of-flight pulse, transmitted by the beacon, takes to travel to the target.

In step 255, the target listens for the time-of-flight pulse which it expects to be returned by the beacon.

In step 260, the target receives the time-of-flight pulse transmitted by the beacon.

In step 265, the value of the timer (e.g., timer 152) is recorded, for example, in a memory of regional positioning module 100 and/or the device (e.g., in the TravelTime register discussed elsewhere herein).

In step 270, the range-finding technique with the beacon is finished. For example, the target may receive (e.g., via DCT 140 of the target) a signal from the beacon indicating that the beacon transmitted a time-of-flight pulse to the target. Upon receiving the signal from the beacon, the target may unpair or otherwise disconnect with the beacon.

In step 275, the distance between the target and beacon may be calculated (e.g., by CPU 120) based on the value of the timer recorded in step 265. For instance, given the recorded round-trip time of flight and a known or estimated velocity of the time-of-flight pulse, the distance may be calculated using the well-known formula:

$$distance = velocity \times time$$

In step 280, the distance calculated in step 275 is recorded, for example, in a memory of regional positioning module 100 and/or the device, in association with the location of the beacon received in step 220.

Thus, after steps 215-280 are performed, the target knows the distance to and location of each of the plurality of beacons selected in step 210. Accordingly, in step 285, the target (e.g., CPU 120) utilizes triangulation to calculate the position of the target using the location of and distance to each beacon.

Beacon procedure 300 will now be described in greater detail, according to the embodiment illustrated in FIG. 2A. Similarly to target procedure 200, beacon procedure 300 may be performed in a matter of milliseconds.

In step 305, a beacon (e.g., a regional positioning module 100 in beacon mode) advertises or otherwise identifies itself (e.g., by broadcasting a wireless signal).

In step 315, the beacon pairs with a target (e.g., using Bluetooth™ LE). Pairing may be performed, for example, by DCT 140 of the beacon.

After successfully pairing with the target, in step 320, the beacon receives a request from the target for the beacon's location, and sends the beacon's location to the target. This step may also be performed, for example, by DCT 140 of the beacon.

In step 325, the beacon receives a request for its pulse delay from the target, and sends its pulse delay value to the target. This pulse delay value may be the value stored in the PulseDelay register discussed elsewhere herein. Again, this step may be performed by DCT 140 of the beacon. Furthermore, it should be understood that the order of steps 320 and 325 may be reversed without affecting beacon procedure 300.

In step 335, the beacon activates a Reflection Mode (e.g., of TRR 150 of the beacon). Steps 340-355 represent a range-finding technique which may be implemented by TRR 150 of the beacon. This technique may be performed in a matter of nanoseconds.

In step 340, the beacon listens for the time-of-flight pulse which it expects to be transmitted by the target.

In step 345, the beacon receives the time-of-flight pulse transmitted by the target.

In step 350, before transmitting its own time-of-flight pulse, the beacon waits the amount of time specified by the pulse delay that was sent to the target in step 325 (e.g., and stored in the PulseDelay register).

In step 355, after waiting the amount of time specified by the pulse delay, the beacon (e.g., via TFT 154 of the beacon) transmits a time-of-flight pulse to the target.

In step 370, the beacon finishes the range-finding. For example, the beacon may signal the target that it has sent the time-of-flight pulse (e.g., via DCT 140 of the beacon), and unpair or otherwise disconnect with the target.

Figure 2A:
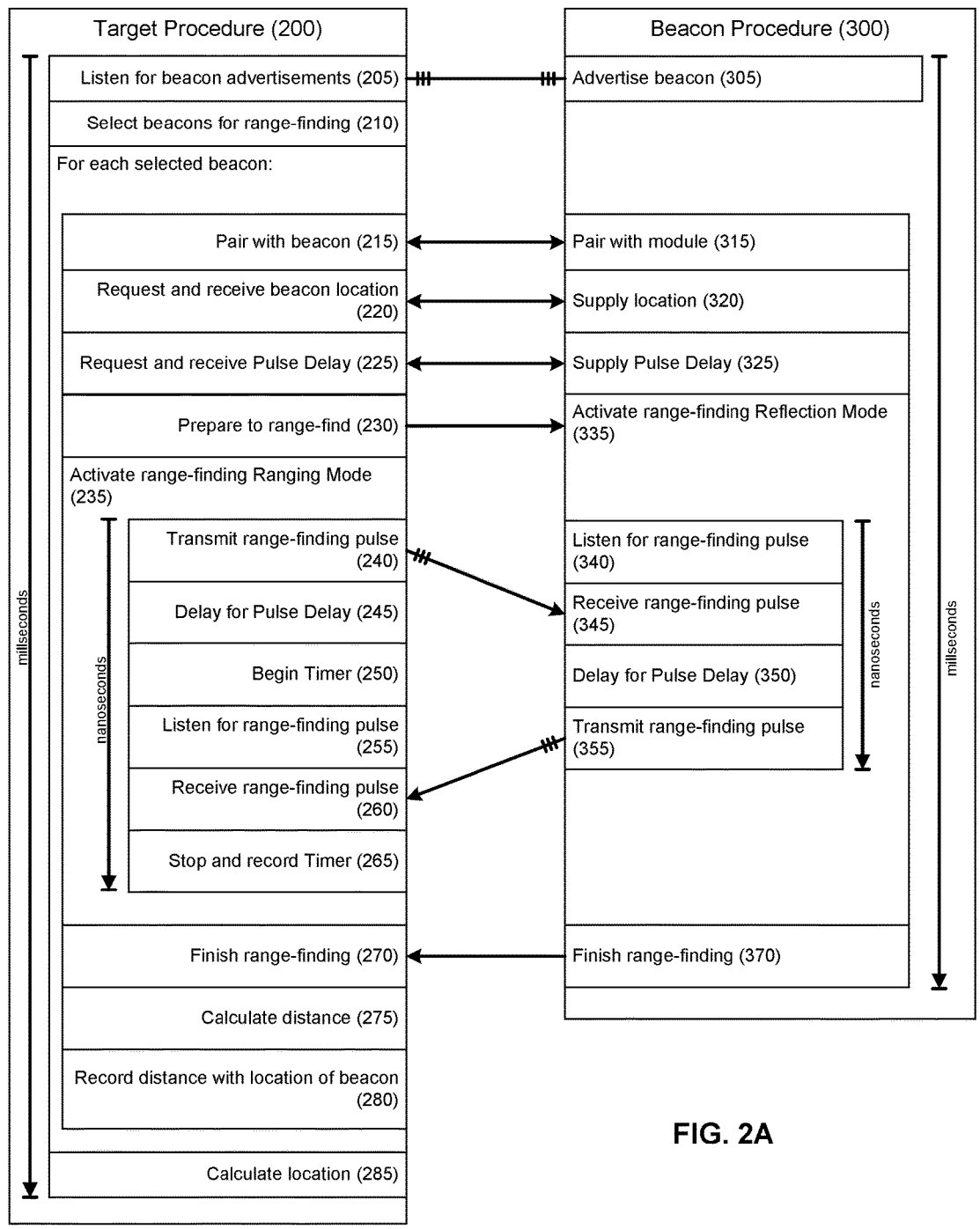
FIGS. 2A-2B illustrate a target procedure and beacon procedure, according to alternative embodiments.
Figure 2B:
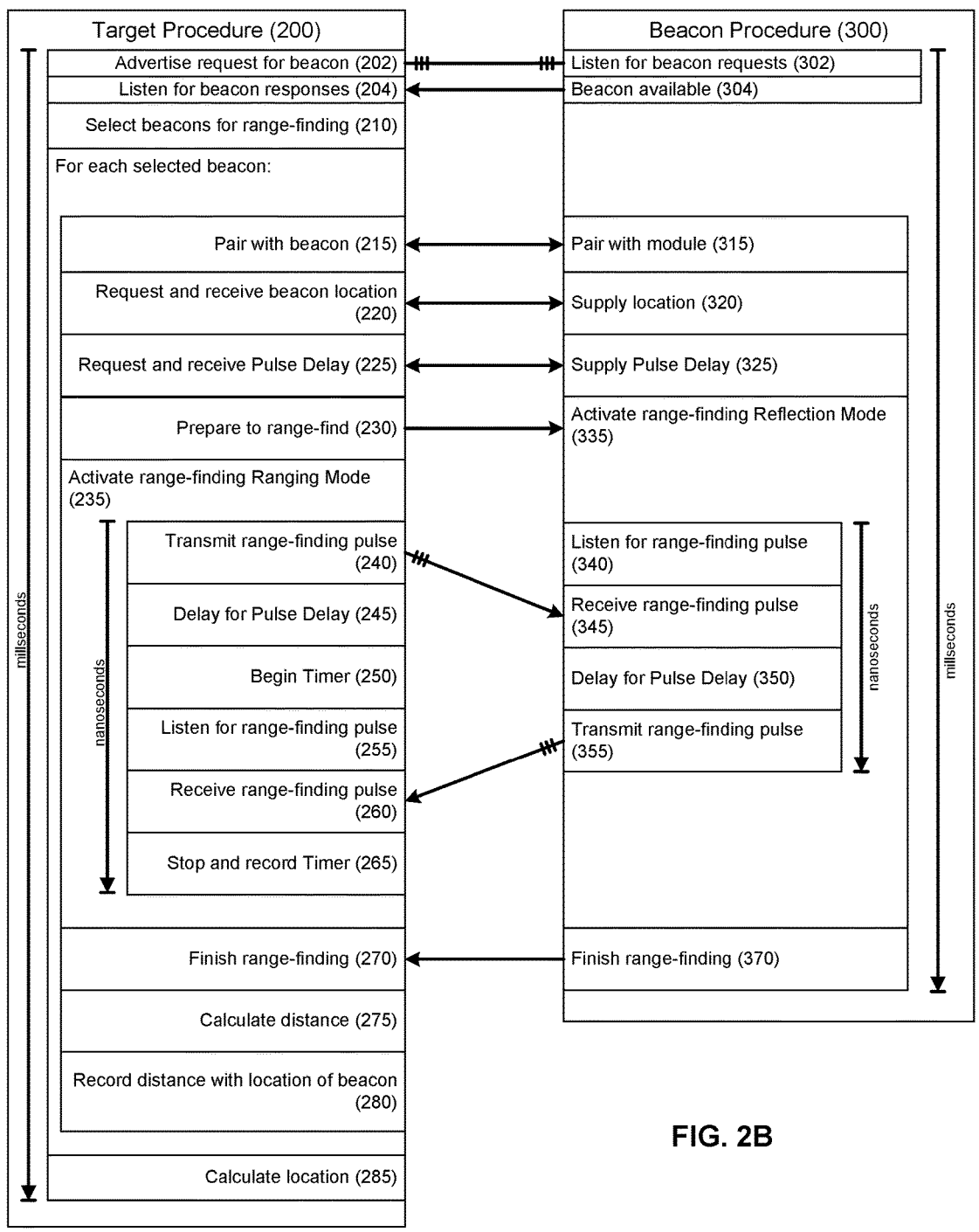

FIG. 2B illustrates an alternative target procedure 200 and beacon procedure 300 to those illustrated in FIG. 2A, according to an embodiment. Target procedure 200 and beacon procedure 300, in FIG. 2B, are identical to target procedure 200 and beacon procedure 300, in FIG. 2A, with the exceptions that step 205 in the target procedure has been replaced with steps 202 and 204, and step 305 in the beacon procedure has been replaced with steps 302 and 304. All of the other steps may be identical to those described above with respect to FIG. 2A.

In step 202, the target advertises or otherwise identifies itself (e.g., by broadcasting a wireless request), and in step 204, the target listens for responses to its request from one or more beacons. During step 204, the target may receive response signals from one or more, including a plurality of, beacons.

Correspondingly, in step 302, the beacon listens for target advertisements (e.g., broadcast signals). During step 302, the beacon may receive broadcast signals from one or more targets. In step 304, for each target, in response to receiving a target advertisement from the target, the beacon sends a response to the target, indicating that the beacon is available for range-finding.

For purposes of further illustration, the various modes of TTR 150 may be expressed as follows:

OFF Mode
No transceiver activity. Response to I2C commands and requests.
RANGING Mode -continued 1. Transmit time-of-flight pulse.
2. Start nanosecond timer.
3. When nanosecond timer reaches PulseDelay,
   3.1. Reset nanosecond timer.
   3.2. Listen for incoming time-of-flight pulse until:
      3.2.1. One microsecond passes: record "TimeOut" into
         TravelTime.
      3.2.2. Time-of-flight pulse is received: record nanosecond
         timer value into TravelTime.
REFLECTION Mode
1. Listen for incoming time-of-flight pulse until:
   1.1. One second passes: record "TimeOut" into TravelTime.
   1.2. Reflection Mode canceled (e.g., by BLD): record "TimeOut"
      into TravelTime.
   1.3. Time-of-flight pulse is received:
      1.3.1. Start nanosecond timer.
      1.3.2. When nanosecond timer reaches PulseDelay,
         1.3.2.1. Transmit time-of-flight pulse.
         1.3.2.2. Record PulseDelay into TravelTime.

3. Example Applications

Regional positioning module 100 may be used with any device for which it may be beneficial to determine a relative or absolute regional (e.g., indoor) position. For example, regional positioning module 100 may be incorporated into a smart phone or other mobile device (e.g., tablet computer, laptop computer, personal digital assistant, etc.). Many such mobile devices already include an accelerometer 110, a CPU 120, a DCT 140 (e.g., Bluetooth™ LE), and/or an antenna 160. In the case that one or more of these components are already incorporated into the device, module 100 may only comprise the remaining component(s) (e.g., TRR 150), which may be communicatively linked to the already-incorporated components, for example, in the same manner as shown in FIG. 1. Thus, for instance, only a TRR chip 150 and software instructions (e.g., implementing one or more steps of the range-finding technique, performing the distance and/or location calculations, implementing the switching between operation modes, etc.) may need to be added to the device to enable the range-finding technique described herein. The software instructions may take the form of a program added to an operating system or memory of the device to be executed by a CPU of the device.

Regional positioning module 100, or TRR 150 and the corresponding software instructions, may also be implemented in a device to be a stand-alone beacon. In this case, the device may be fixed at a particular location, such that it represents a stationary beacon. In addition, the software instructions may be minimal or omitted altogether, since the device may not need to perform target procedure 200, may not need to perform many of the calculations described herein (e.g., distance and location calculations), may not need to switch between target and beacon modes, etc. For example, to act as a stand-alone beacon, a TRR chip, with associated firmware, may simply be combined with a standard Bluetooth™ LE CPU, such as the TI2540.

As another example application, regional positioning module 100 and/or TRR chip 150 may be used in a battlefield positional awareness system. For instance, a plurality of highly-resilient, miniaturized, and/or self-contained regional positioning modules 100 (e.g., hundreds or thousands of such modules) may be spread out over a theater of operation (e.g., via incorporation into vehicles, technology worn or carried by soldiers, structures, and/or the like). Each of these modules 100 may switch to a target mode, when in motion in the theater of operation, to determine its position by performing range-finding with other modules 100 that are in beacon mode. In addition, each of these modules 100 may switch to a beacon mode, when stationary in the theater of operation, to allow other modules 100 that are in target mode to perform range-finding to determine their respective locations.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A method comprising using at least one hardware processor of a device to:
   determine whether the device is moving or stationary;
   when the device is determined to be moving, operate in a target mode to
      select a plurality of beacon devices,
      for each of the plurality of beacon devices,
         connect to the beacon device,
         transmit a first pulse to the beacon device,
         receive a second pulse from the beacon device,
         time a flight duration including both a time of flight of the first pulse and a time of flight of the second pulse, and
         calculate a distance to the beacon device based on the flight duration, and
      compute a location of the device based on the calculated distances for the plurality of beacon devices and locations of the plurality of beacon devices; and,
   when the device is determined to be stationary, operate in a beacon mode to act as a beacon device for another device that is operating in the target mode by
      receiving a third pulse from the other device,
      upon receiving the third pulse from the other device, waiting for a time period indicated by a pulse delay value, and
      once the time period ends, transmitting a fourth pulse to the other device.

2. The method of claim 1, further comprising receiving a broadcast signal from each of a set of beacon devices, wherein the plurality of beacon devices are selected from the set of beacon devices from which a broadcast signal was received.

3. The method of claim 1, further comprising:
   sending a broadcast signal; and
   receiving a response to the broadcast signal from at least each of the plurality of beacon devices.

4. The method of claim 1, wherein connecting to the beacon device comprises pairing to the beacon device using a first transceiver.

5. The method of claim 4, wherein the first pulse is transmitted and the second pulse is received using a second transceiver that is different than the first transceiver.

6. The method of claim 4, wherein the first transceiver utilizes a wireless communication protocol.

7. The method of claim 6, wherein the wireless communication protocol is Bluetooth™ low-energy.

8. The method of claim 1, further comprising, for each of the plurality of beacon devices, receiving a location of the beacon device from the beacon device, wherein the location of the device is computed based on the calculated distances for the plurality of beacon devices and the locations received from the plurality of beacon devices.

9. The method of claim 8, wherein, for each of the plurality of beacon devices, the distance to the beacon device is calculated based on the flight duration and the received location of the beacon device.

10. The method of claim 1, further comprising, for each of the plurality of beacon devices, receiving a pulse delay value from the beacon device.

11. The method of claim 10, wherein the second pulse is received during a listening period, and wherein the method further comprises, for each of the plurality of beacon devices, upon transmitting the first pulse, waiting for a time period indicated by the pulse delay value before initiating the listening period.

12. The method of claim 10, wherein the flight duration is timed so as to exclude a time period indicated by the pulse delay value.

13. The method of claim 12, wherein timing the flight duration comprises:
   upon transmitting the first pulse, waiting for the time period indicated by the pulse delay value before initiating a timer;
   once the time period indicated by the pulse delay value ends, initiating the timer; and,
   upon receiving the second pulse, stopping the timer, and recording a value of the timer as the flight duration.

14. The method of claim 1, wherein the plurality of beacon devices comprise at least three beacon devices.

15. The method of claim 14, wherein the plurality of beacon devices comprise at least four beacon devices.

16. The method of claim 14, wherein computing a location of the device comprises triangulating the location of the device based on the calculated distances for the plurality of beacon devices and the locations of the plurality of beacon devices.

17. The method of claim 1, wherein the flight duration is timed in nanoseconds.

18. The method of claim 1, further comprising using at least one hardware processor of at least one of the plurality of beacon devices to:
   receive the first pulse from the device;
   upon receiving the first pulse, wait for a time period indicated by a pulse delay value; and,
   once the time period ends, transmit the second pulse to the device.

19. The method of claim 18, further comprising using the at least one hardware processor of the at least one beacon device to:
   transmit a broadcast signal; and
   receive a connection request from the device,
      wherein the connection between the device and the at least one beacon device is in response to the connection request.

20. The method of claim 18, further comprising using the at least one hardware processor of the at least one beacon device to, after connecting to the device, transmit a location of the at least one beacon device to the device.

21. The method of claim 18, further comprising using the at least one hardware processor of the at least one beacon device to, after connecting to the device, transmit the pulse delay value to the device.

22. The method of claim 18, further comprising using the at least one hardware processor of the at least one beacon device to, after transmitting the second pulse to the device, transmit a signal to the device indicating that the second pulse has been transmitted to the device, and disconnecting from the device.

23. A system comprising:
a transceiver; and
at least one hardware processor that
determines whether the system is moving or stationary,
when the system is determined to be moving, operate in a target mode to
select a plurality of beacon devices,
for each of the plurality of beacon devices,
connect to the beacon device,
transmit a first pulse to the beacon device via the transceiver,
receive a second pulse from the beacon device via the transceiver,
time a flight duration including both a time of flight of the first pulse and a time of flight of the second pulse, and
calculate a distance to the beacon device based on the flight duration, and
compute a location of the system based on the calculated distances for the plurality of beacon devices and locations of the plurality of beacon devices, and,
when the system is determined to be stationary, operate in a beacon mode to act as a beacon device for another system that is operating in the target mode by
receiving a third pulse from the other system,
upon receiving the third pulse from the other system, waiting for a time period indicated by a pulse delay value, and,
once the time period ends, transmitting a fourth pulse to the other system.

24. A non-transitory computer-readable medium having instructions stored thereon, wherein the instructions, when executed by a processor, cause the processor to:
determine whether a device, comprising the processor, is moving or stationary;
when the device is determined to be moving, operate in a target mode to
select a plurality of beacon devices,
for each of the plurality of beacon devices,
connect to the beacon device,
transmit a first pulse to the beacon device,
receive a second pulse from the beacon device,
time a flight duration including both a time of flight of the first pulse and a time of flight of the second pulse, and
calculate a distance to the beacon device based on the flight duration, and
compute a location of the processor based on the calculated distances for the plurality of beacon devices and locations of the plurality of beacon devices; and,
when the device is determined to be stationary, operate in a beacon mode to act as a beacon device for another device that is operating in the target mode by
receiving a third pulse from the other device,
upon receiving the third pulse from the other device, waiting for a time period indicated by a pulse delay value, and,
once the time period ends, transmitting a fourth pulse to the other device.

* * * * *